E. F. NORTHRUP.
RESISTANCE.
APPLICATION FILED JAN. 9, 1915.
1,146,592.
Patented July 13, 1915.
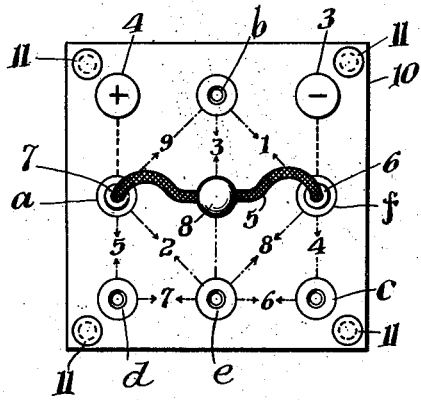
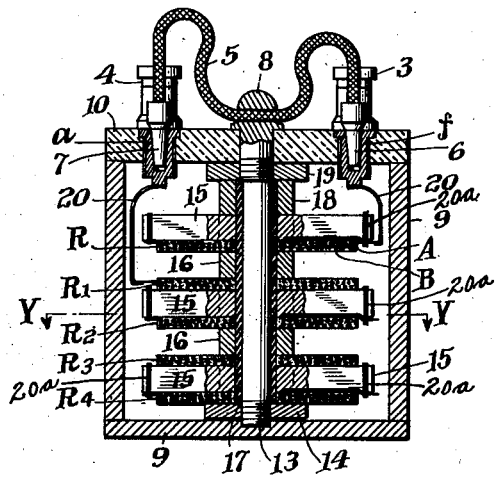
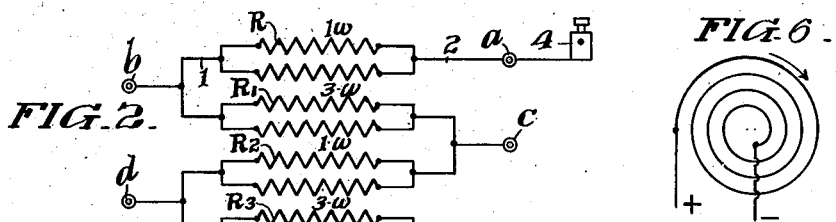
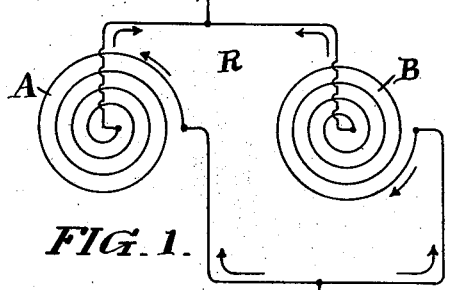
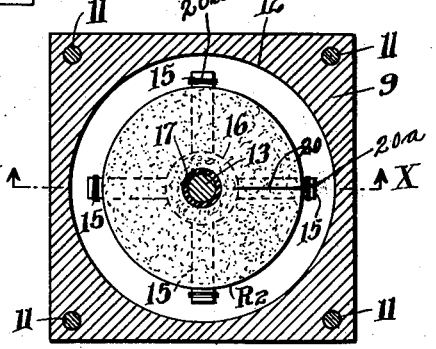
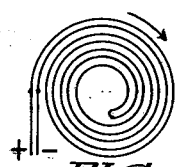
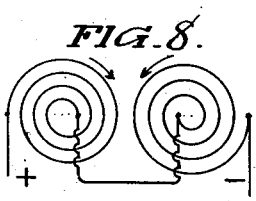
WITNESSES
INVENTOR
Edwin F. Northrup
BY Cornelius D. Ehret
ATTORNEY

UNITED STATES PATENT OFFICE.

EDWIN F. NORTHRUP, OF PRINCETON, NEW JERSEY.

RESISTANCE.

1,146,592.   Specification of Letters Patent.   Patented July 13, 1915.

Application filed January 9, 1915. Serial No. 1,360¼.

*To all whom it may concern:*

Be it known that I, EDWIN F. NORTHRUP, a citizen of the United States, residing in the city of Princeton, county of Mercer, and State of New Jersey, have invented a new and useful Resistance, of which the following is a specification.

My invention relates to a resistance conductor, coil or unit suitable for use in those relations, as with undulating, fluctuating or alternating currents having relatively high frequencies, where the inductance and capacity effects are required to be *nil* or substantially *nil*, or at least negligible; though it will be understood the resistance may be employed with direct current or fluctuating or alternating current of low frequency. Such a conductor or resistance may be used more particularly as the resistance of a Wheatstone bridge or any of its modifications or of other measuring apparatus suitable for making determinations or measurements of or respecting alternating or fluctuating or undulating currents, such, for example, as alternating currents of frequencies above the usual commercial frequencies, or undulating or fluctuating currents, such as complex telephonic currents comprising components of many different but relatively high frequencies.

My conductor or resistance may have a resistance of any desired fraction of unit resistance, may have unit resistance, or any desired multiple of unit resistance; and a plurality of my resistances of similar or different resistance values, may be suitably associated with each other to form any convenient set, as a decade set, or a resistance box, or resistances or rheostats of the arms of a Wheatstone bridge, or any of its modifications, or other measuring or other electrical precision apparatus.

My conductor or resistance, which I shall hereinafter refer to for the sake of brevity as a resistance unit, comprises, in its preferred form two (or other even number of) flat spirally wound coils of similar dimensions, equal in number of turns or convolutions, of conductors which are preferably of the same resistivity and same cross section, the coils being connected in parallel with each other and having their terminals of one polarity, for example positive, at the outer ends of the spirals and their other terminals of opposite polarity at the inner ends of the spirals. The coils of a pair are wound in opposite directions so that when one coil is superposed upon the other any magnetic field produced by the one is neutralized by the other, whereby the inductance of the unit is *nil* or negligible, even for high frequencies, and the capacity effects are also *nil* or negligible because the composite unit is substantially a disk which exhibits minimum capacity effects.

The resistance may also take the form of a single coil spirally wound and flat, such coil having desirable characteristics though exhibiting inductance and small capacity.

The resistance may also take the form of a bifilar spirally wound flat coil which has capacity but small inductance. Or the resistance may take the form of two serially connected flat superposed spirally wound coils, so connected or wound that they produce substantially no magnetic field, such a resistance having capacity but small inductance.

For an illustration of one of the forms my invention may take reference is to be had to the accompanying drawings, in which:

Figure 1 is a diagrammatic view illustrating my resistance unit. Fig. 2 illustrates a convenient mode of connection of a plurality of my units suitable for employment as a decade set. Fig. 3 is a cross sectional view through such decade set taken on the line X—X of Fig. 4. Fig. 4 is a horizontal sectional view taken on the line Y—Y of Fig. 3. Fig. 5 is a top plan view of the apparatus of Fig. 3. Figs. 6, 7 and 8 illustrate modified forms of resistance coils.

Referring to Fig. 1, a resistance coil or unit R comprising two component coils is shown diagrammatically. The components are the two similar flat spiral coils A and B connected in parallel with each other between the circuit or terminal leads 1 and 2. They have the same number of turns or convolutions of conductors of the same resistivity and cross section but wound in opposite directions. Assuming the lead or terminal 1 to be positive, at any instant, and lead or terminal 2 to be negative, current will traverse the coils A and B in the directions indicated by the arrows, whereby, when the coil A is superimposed upon the coil B their magneto-motive forces tending to produce magnetic fluxes will be opposed and will neutralize each other so that there is substantially no resultant magnetic flux, and, therefore, the inductance of the unit R will be substantially *nil*. With the coils A and B superposed as stated, each is substantially a disk with its outer edge positive, at the instant assumed, and its center negative with the result that the capacity exhibited is also substantially *nil*. If the resistance unit R is to have, for example, a resistance of one ohm, each coil A and B will have a resistance of two ohms.

While in general each unit R will consist of two component coils it will be understood that it may comprise four, six, or other even number of component coils which may be superimposed upon each other in any suitable order and all preferably connected in parallel with each other and so disposed that the resultant magnetic flux is substantially nil.

It will, of course, be understood that neighboring convolutions of each coil are insulated from each other and that the superimposed component coils are insulated from each other.

A convenient construction consists of the superimposed coils embedded in or impregnated with suitable moldable plastic insulating material, such as a hard wax, or other suitable material which will preferably not absorb or take up moisture and which, should the coils become warm or hot will not cause any undue strain to be exerted upon the resistance conductor. The resultant unit is a flat disk like element which will readily radiate the heat which may be produced in the resistance conductors, and, therefore, prevent excessive rise in temperature.

Obviously the resistance conductor may be such as has very small or substantially no temperature coefficient, that is, of such material as changes in resistance very slightly, if at all, with changes of temperature.

A plurality of such resistance units may be conveniently assembled to form a rheostat different portions of which may be connected in circuit for procuring different resistance values. For example, five such units may be connected as illustrated in Fig. 2 to form a decade set, of which the unit R may have a resistance of one ohm; unit $R^1$ a resistance of three ohms; unit $R^2$ a resistance of one ohm; unit $R^3$ a resistance of three ohms and unit $R^4$ a resistance of two ohms. The five resistance units are connected in series with each other between the binding posts 3 and 4 whereby ten ohms are brought into a circuit connected to these binding posts. Each terminal of each resistance unit is connected to a socketed conducting member adapted to receive a plug forming the terminal of a conductor, such as a flexible cord conductor 5 of Figs. 3 and 5. The plug socket members are indicated at $a$, $b$, $c$, $d$, $e$, and $f$, and the plugs at 6 and 7. The cord 5 may extend through the member 8 serving as a holder therefor.

With the plugs in the sockets $a$ and $f$, as indicated in Figs. 3 and 5, all the resistance units are short circuited giving therefore the zero value of the set. One ohm is brought into circuit by inserting the plugs in sockets $b$ and $f$, whereby all except unit R are short circuited; two ohms are brought into circuit by inserting the plugs in $a$ and $e$, whereby all except resistance unit $R^4$ are short circuited; three ohms are provided by inserting the plugs in $b$ and $e$, whereby all but units R and $R^4$ are short circuited; and so on by placing the plugs in suitable sockets resistances up to nine ohms may be brought into circuit; when the plugs are not inserted, ten ohms are brought into circuit.

As indicated in Fig. 3, the units may be placed in a suitable container as a wooden box 9 having for example a hard rubber top 10 secured to the box by the screws 11, the box having a circular opening or bore 12, if desired, as indicated in Fig. 4. A bolt or rod 13 has threaded on its lower end a nut or washer 14 upon which rests the unit $R^4$ upon which rests the arms 15 of wood or other suitable material secured at their inner ends to the cylinder 16 of wood or other suitable material through which the bolt 13 and its surrounding hard rubber tube 17 extends, the resistance units having apertures at their centers allowing them to pass over the tube 16. Upon the lowermost arms 15 rests the unit $R^3$, and so on, the various units are disposed in place and separated by other sets of arms 15. Upon the upper set of arms 15 rests the tubular washer 18 held in place by the nut or washer 19 threaded upon the bolt 13 which is supported by the cover 10. The connections from the units to the socket members $a$ to $f$ inclusive, are made as by conductors 20, only some of each are shown in Figs. 3 and 4.

The conductor 20 is connected to the inner terminals of the two resistance conductors and extends beneath the disk, arm 15 being cut away to accommodate the conductor 20 which is then bound to the arm 15 in any suitable way as indicated at $20^a$. The outer terminals of the coils are similarly connected to a connecting conductor which may be similarly bound or attached to an arm 15.

It will be understood, of course, that the resistance units may have other resistances than those assumed for the purpose of illustration. With other decade sets of units of 10 ohms, 100 ohms, 1000 ohms, making four decade sets altogether, a range from 1 ohm to 11,110 ohms is available.

From Fig. 5 it will be noted that the plug sockets are symmetrically arranged in a highly convenient manner, with indications or markings between plug sockets of the amount of resistance which will be brought into circuit by inserting the plugs in those sockets. Thus the numeral 9 indicates that 9 ohms will be brought into circuit by inserting the plugs in the sockets $a$ and $b$, between which the numeral 9 is stamped or engraved upon the cover 10. It will be seen from this arrangement that no confusion in resistance indications arises, because indications are associated only with plug sockets between which no other plug socket intervenes.

In Fig. 6 is illustrated a form of coil or resistance unit which consists of a single coil wound in a flat spiral. Such a coil will exhibit both inductance and capacity effects.

In Fig. 7 is shown a bifilar spirally wound flat coil which exhibits capacity but small inductance.

In Fig. 8 is shown a composite resistance or unit comprising two flat spirally wound coils connected in series with each other and, when superposed as hereinbefore described, exhibits very small inductance effect though having some capacity. The small inductance is due to the fact that the current in passing serially through the windings passes first in one direction in one coil and then in opposite direction through the other coil.

For units or coils of low resistance values, where capacity effects are not so relatively important as inductance effects, the arrangements of Figs. 7 and 8 may be used. And whenever inductance or capacity effects are of little or no importance the still simpler form of Fig. 6 may be used, it being understood that all the forms herein described have the advantage, aside from low inductance or capacity effects, of readily radiating, due to their form, the heat that may be developed in them by current flowing therethrough, and have a further advantage in form suitable for very compact assembly and mounting. And from the fact that the form is such that heat is readily radiated, the resistance conductor may be operated at relatively higher current density, without danger of over heating, and with the further result that for a given value of resistance a smaller amount of resistance conductor material is required, which both cheapens the unit and makes its dimensions relatively small.

I am aware that resistances for various purposes including electric heaters have been wound in flat spirals, with various arrangements of connections, for use in producing heat by passing electric current therethrough. I believe myself, however, to be the first to produce for purposes of electrical measurements and kindred purposes where delicacy and precision are required resistances of the herein described and claimed structure and characteristics. And for the sake of brevity I employ in the appended claims the term "precision" for describing my resistance as useful in the last named relations.

What I claim is:

1. A precision resistance unit whose inductance is practically *nil* comprising superimposed flat spirally and oppositely wound coils connected in parallel with each other.

2. A precision resistance unit having practically no inductance and practically no capacity comprising superimposed flat spirally and oppositely wound coils connected in parallel with each other and having their terminals of like polarity at similar ends of the spirals.

3. A precision resistance unit whose inductance is practically *nil* comprising superimposed flat spirally and oppositely wound coils connected in parallel with each other, said coils held in place with respect to each other by a common support.

4. A precision resistance unit having practically no inductance and practically no capacity comprising superimposed flat spirally and oppositely wound coils in parallel with each other and having their terminals of like polarity at similar ends of the spirals, said coils being held in place with respect to each other by a common support.

5. A precision resistance unit whose inductance is substantially *nil* comprising superimposed flat spirally and oppositely wound coils connected in parallel with each other, and a mass of insulating material in which said coils are embedded.

6. A precision resistance unit having practically no inductance and practically no capacity comprising superimposed flat spirally and oppositely wound coils connected in parallel with each other and having their terminals of like polarity at similar ends of the spirals, and a mass of insulating material in which said coils are embedded.

7. A disk shaped precision resistance unit having practically no inductance and practically no capacity comprising a mass of insulating material in which are embedded a pair of superimposed flat spirally and oppositely wound coils connected in parallel having their terminals of like polarities at similar ends of the spirals.

8. A self sustaining precision resistance unit comprising an even number of superimposed flat spirally and reversely wound coils embedded in insulating material.

9. A precision resistance unit whose inductance is substantially *nil* comprising an even number of superimposed flat spirally and reversely wound coils, the terminals of said coils of like polarity being disposed at similar ends of the spirals.

10. A precision resistance unit comprising a pair of superimposed flat spirally and oppositely wound coils of equal numbers of turns connected in parallel.

11. A precision resistance unit comprising a flat spirally wound coil having predetermined ohmic resistance, and insulating material by which said unit is completely surrounded and embedded to render the same a thin self-sustaining disk.

12. A precison resistance unit having low inductance comprising flat spirally wound conductors connected to oppose each other magnetically, and insulating material by which said conductors are completely surrounded and embedded to render the same a thin self-sustaining disk.

13. A precision resistance unit for electrical measurements comprising superimposed flat spirally wound coils, and insulating material embedding and holding said coils in fixed relation with respect to each other and rendering them self sustaining.

14. A precision resistance set comprising a plurality of flat self sustaining resistance units disposed side by side, a member extending through said resistance units for supporting the same, and separators between said units.

15. A decade resistance set comprising two resistance units each of predetermined resistance value, one unit of double such resistance value and two units of triple such resistance value, means connecting all said units in series, contacts forming terminals of said units, and a pair of movable contacts connected with each other and adapted to engage any of the different pairs of said terminal contacts to short circuit different numbers of said resistance units, whereby ten values of resistance are available.

16. A resistance set comprising a plurality of serially connected resistance units, contacts forming terminals of said units, a pair of movable contacts connected with each other and adapted to engage different pairs of said terminal contacts to short circuit different numbers of said resistance units, and means between pairs of said terminal contacts indicating the resistance of said set when said movable contacts engage the terminal contacts of said pairs.

17. A resistance set comprising a plurality of serially connected resistance units, contacts forming terminals of said units, a pair of movable contacts connected with each other and adapted to engage different pairs of said terminal contacts to short circuit different numbers of said resistance units, and means between pairs of said terminal contacts indicating the resistance of said set when said movable contacts engage the terminal contacts of said pairs, said terminal contacts being so arranged that there is no terminal contact between and in alinement or substantial alinement with the contacts of the different pairs.

18. A precision resistance set comprising a plurality of self-sustaining disk resistance coils, means holding said coils side by side and spaced from each other, a member supporting said means, and coil terminals on said member.

19. The combination with a flat spirally wound precision resistance coil, of material rendering said coil self sustaining, said coil having a central aperture, one terminal of said coil disposed at said aperture, a lead from said terminal, and a member supporting said coil having an aperture registering with said coil aperture.

20. The combination with a flat spirally wound precision resistance coil, of material rendering said coil self sustaining, said coil having a central aperture, one terminal of said coil disposed at said aperture, a lead from said terminal, and a member supporting said coil having an aperture registering with said coil aperture, said member being recessed to receive said lead.

21. A precision resistance unit comprising a pair of superimposed flat spirally wound coils, a mass of insulating material adhering to said coils and embedding the same and holding the same in fixed relation with respect to each other in the form of a disk.

22. A precision resistance unit comprising a pair of superimposed flat spirally wound coils, a mass of hard wax adhering to said coils and embedding the same and holding the same in fixed relation with respect to each other in the form of a disk.

In testimony whereof I have hereunto affixed my signature in the presence of the two subscribing witnesses.

EDWIN F. NORTHRUP.

Witnesses:
   IRVING W. MUSHON,
   V. B. LEIGH.